Sept. 9, 1947.  A. MUHLBACH  2,427,226
MOUNTING FOR ROLLER CUTTERS
Filed May 15, 1944

INVENTOR
Alfred Muhlbach
BY John Flam
ATTORNEY

Patented Sept. 9, 1947

2,427,226

UNITED STATES PATENT OFFICE 2,427,226

MOUNTING FOR ROLLER CUTTERS

Alfred Muhlbach, Los Angeles, Calif.

Application May 15, 1944, Serial No. 535,635

7 Claims. (Cl. 308—174)

This invention relates to roller bits, such as are extensively used in the drilling of oil wells; more particularly, it relates to the mounting of the roller cutters in such bits.

It is common practice to provide roller bits with radially transversely disposed pins upon which cutters are rotatably supported by antifriction bearings, which bearings are arranged so that in addition to radially supporting the cutter on the pin, some of these bearings cooperate with surfaces on the pin to act as thrust bearings to resist forces tending to move the cutter axially of the pin. In this way the cutter is axially positioned on the pin. To provide for assembly of the cutter and bearings on the pin, at least one of the thrust surfaces thereon is usually formed on a member adapted to be appropriately secured on the pin after the cutter and bearing elements are in place.

It is an object of the present invention to provide improved means for securing such a thrust member on the pin.

Thrust members of this type have sometimes been secured on the pin either by being directly threaded thereon or by engaging a third member threadedly engaging the pin. However, there is always a tendency for the thrust member to turn with the cutter, and with a conventional thread and a drill bit turning in the usual direction (as clockwise) any such rotation of the thrust member or its securing means has the effect of urging the thrust surfaces together. This undesirably increases the friction of the cutter against rotation, frequently resulting in the cutter ceasing to rotate or becoming stuck, which interferes with proper operation of the drill and necessitates removal of the bit from the hole. When it is considered that the removal of a drill string for such purpose involves the employment of several men and much expensive equipment for from eight to twenty-four hours, together with the possibility of damage or even loss of hole, the importance of preventing such mishaps will be readily apparent. It is thus another object of this invention to provide means for securing a thrust member on its supporting pin, in which the normal rotation of the cutter has no tendency to cause the thrust member to tighten or to stick the cutter.

To prevent the aforementioned difficulties, such thrust members have sometimes been welded or otherwise secured to the pin, either as a sole means of attachment or in conjunction with a conventional thread. Welding for this purpose is not satisfactory, since it nullifies the effect of previous heat treatment of the thrust member, rendering the member soft and subject to rapid wear. Neither is a mechanical fastening satisfactory, since it complicates the structure. It is thus still another object of this invention to provide a thrust member construction wherein the need of welding or other fastening means to maintain the thrust washer against tightening incident to rotation of the cutter is obviated.

The invention possesses many other advantages, and has other objects which may be made more easily apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Figure 1:
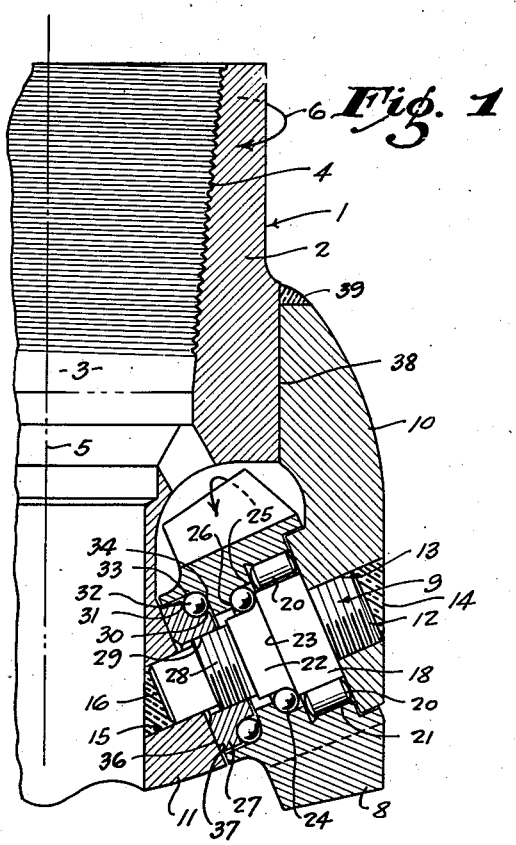
Figure 1 is fragmentary vertical section through a drill bit having a roller cutter mounted in accordance with the invention.
Figure 2:
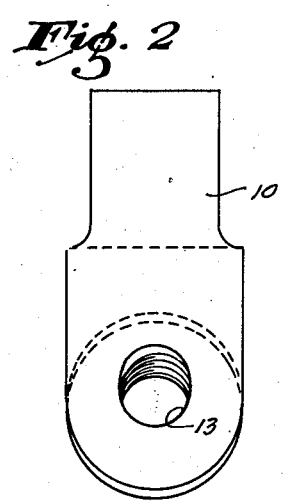
Fig. 2 is a front elevation of the mounting arm for the cutter of Fig. 1.
Figure 4:
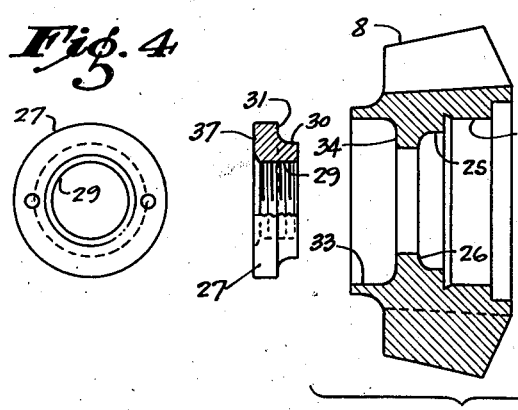
Fig. 4 is an elevation of the cutter retaining member of Fig. 1.
Figure 3:
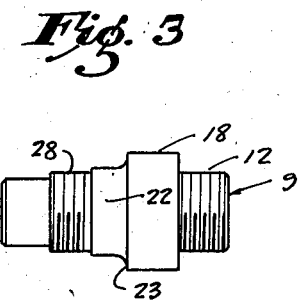
Fig. 3 is a disassembled view of the cutter mounting.

Referring to the drawing, a drill bit 1 is shown which includes a bit body 2 having a through opening 3 for the reception of a core barrel (not shown) arranged to be supported in the lower end of bore 3 in a well known manner. However, it is to be understood that the cutter mounting to be presently described is not limited to this type of bit or to core drills, but is applicable to roller bits in general. The upper portion of the through opening 3 is enlarged and provided with screw threads 4 by which bit 1 may be attached to a drill string for rotation about the axis 5 of the bit. Such rotation is substantially always, at least during a drilling operation, in the direction of the arrow 6 or clockwise as viewed from above; this can therefore be accurately referred to as the normal direction of rotation.

Bit 1 is arranged to operate over a circular zone extending about the axis 5 and as far as the outside of the bit, and for this purpose may have several cutters of any preferred form, one of the cutters for operating on the outer portion of the zone being indicated by the numeral 8. Cutter 8 is rotatably mounted on body 2 by a pin 9 which extends inwardly from the exterior of the body 2, being supported in an arm 10 arranged to be secured on the exterior of body 2 as by being welded thereto, and in a central extension 11 of the body.

Pin 9 may be formed integrally with arm 10, but for convenience in manufacture, is preferably formed separately as shown. Thus, pin 9 is provided with a threaded stub 12 which engages a correspondingly threaded opening 13 in the arm, and is secured therein as by welding 14. The inner end portion of pin 9 is supported in a suitable opening 15 formed in the central extension 11 of body 2 and is also secured therein as by welding indicated at 16.

Cutter 8 is mounted on pin 9 by the aid of a plurality of antifriction bearings, which support the radial load on the cutter as well as securing the cutter 8 against axial movement on pin 9. Thus adjacent arm 10, pin 9 is provided with an enlarged cylindrical portion 18 forming the inner race for cooperating with a series of cylindrical rolling bearing elements 20 which support cutter 8 by engaging the cylindrical surface 21 in the cutter. Pin 9 has a cylindrical portion 22 of reduced diameter adjacent portion 18 and forming a shoulder 23 therewith. The surface of the cylindrical portion 22 and shoulder 23 engage the balls 24 which in turn engage an inner cylindrical surface 25 and a shoulder 26 opposing shoulder 23, in cutter 8. Surfaces 22, 23 and 25, 26, cooperate with balls 24 to form a radial and thrust bearing for supporting cutter 8 on pin 9, but acting principally as a thrust bearing to limit movement of cutter 8 axially on pin 9 toward arm 10.

To secure the cutter 8 on pin 9 and to provide a thrust bearing for limiting movement of cutter 9 away from arm 10, a retaining or thrust member 27 is secured on pin 9 adjacent the inner face of the cutter. For this purpose, pin 9 is provided with a threaded portion 28 adjacent portion 22 which engages a correspondingly threaded bore 29 in member 27. Member 27 is provided with cylindrical and annular surfaces 30 and 31 respectively which cooperate with balls 32 and opposing cylindrical and annular surfaces 32 and 33 in cutter 8 to form a radial and thrust bearing for supporting the inner end portion of cutter 8 and limiting inward movement of cutter 8 axially on pin 9 away from arm 10.

It is of course intended that when the parts are assembled for use that cutter 8 be freely rotatable on pin 9 and yet be held against any substantial axial movement thereon. The threaded connection between pin 9 and retaining member 27 makes possible appropriate adjustment for this purpose, and at the same time facilitates assembly of the parts.

Retaining member 27 is freely rotatable on pin 9 except for the frictional engagement of the threaded portions 28 and 29, and it will be obvious that the rotation of cutter 8, as in a drilling operation exerts a small force or drag tending to cause the member 27 to rotate with cutter 8. It is very important that any such tendency of member 27 to turn be prevented, at least from operating to tighten the thrust bearings as by decreasing the distance between shoulders or annular surfaces 23 and 31. If such tightening once starts, it will rapidly increase to such a point that the bearings will be ruined and/or the cutter will become stuck and no longer will rotate, resulting in failure of the tool.

To avoid such possibility as well as the need for relying on mechanical connections between the retaining member 27 and other parts of the apparatus to prevent such tightening, advantage is taken of the fact that the cutter 8 practically always turns in the same direction. Thus for normal rotation of the bit as indicated by arrow 6, cutter 8 turns counterclockwise as viewed from the right or exterior of the bit. Accordingly by forming thread 28 as a left hand thread, any rotation of member 27 incident to rotation of cutter 8 is in a direction to loosen the thrust bearings or cause surfaces 23 and 31 to move apart. It is not desirable for cutter 8 to have too much axial freedom, but a small amount can be tolerated, and any reasonable amount will not cause a failure of the drill. Furthermore any tendency to loosen the bearings does not aggravate itself as would be the case if the bearings tended to become tighter.

However, to prevent number 27 from unduly loosening the bearings, the body extension 11 is provided with a surface 36 which engages the back surface 37 of member 27 to limit the movement thereof. The parts are so proportioned that with surfaces 36 and 27 in contact, the thrust bearings will be properly adjusted for free rotation of cutter 8. Due to the direction of thread 28 with respect to the direction of rotation of cutter 8, any tending of member 27 to turn caused by the rotation of the cutter will tend to loosen the bearings and will be opposed by the engagement of surfaces 36 and 27.

The method of assembly should be obvious. The cutter 8 and the rolling bearing elements 20, 24 and 32, together with the retaining member 27, are assembled in pin 9 in arm 10. The arm 10 is then positioned to aline pin 9 with aperture 15, and the arm 10 moved in an inclined direction causing the pin to enter the aperture until the arm 10 contacts the body at 38. The arm is then welded to the body as at 39, pin 9 being welded in aperture 15, as previously mentioned.

The inventor claims:

1. In an anti-friction bearing, means forming a non-rotatable pin, means supporting said pin at its ends, an element rotatably mounted on the pin, a retaining member mounted on the pin adjacent one end thereof for restraining axial movement of said element in one direction axially of the pin, said member being so mounted as to move axially of the pin in response to rotation imparted by said element, the supporting means adjacent the member limiting axial movement of the retaining member in one direction.

2. In an anti-friction bearing, means forming a non-rotatable pin, means supporting said pin at its ends, an element rotatably mounted on the pin and having a normal direction of rotation, cooperating members on the pin for restraining movement of said element axially of the pin, one of said members being so mounted on the pin as to move away from the other member in response to rotation imparted by said element rotating in a normal direction, said support means serving to limit the separation of said members.

3. In an anti-friction bearing, means forming a non-rotatable pin, means supporting said pin at its ends, an element rotatably mounted on the pin and having a normal direction of rotation, cooperating members on the pin for restraining movement of said element axially of the pin, at least one of said members being threaded on the pin, the direction of the threads being such as to cause said one member to move away from the other member in response to rotation imparted to said one member by said element rotating in a normal direction, said support serving to limit the separation of said members.

4. In an anti-friction bearing, means forming a non-rotatable pin, means supporting said pin at its ends for normal movement in one direction having at least a component extending transverse of the pin, an element freely rotatable on the pin and adapted to be rotated in response to said movement of the pin, a retaining member on the pin for restraining axial movement of said element in one direction on the pin, said member being so secured to the pin as to be movable axially therealong in response to rotation imparted by said element to permit axial movement of said element, said support serving so to restrict movement of said member as to allow only limited axial movement of the element.

5. In an anti-friction bearing, means forming a non-rotatably supported pin having an enlarged portion for radially supporting a rotatable element, said portion providing a shoulder cooperating with rolling bearing elements and a surface on said rotatable element, to form a thrust bearing acting independently of the radial support provided by said enlarged portion, restricting axial movement of said element in one direction, and means forming a combined radial and thrust bearing adjacent the other end of the pin for rotatably supporting said element and restricting axial movement thereof in the other direction.

6. In an anti-friction bearing, means forming a pin non-rotatably supported at at least one end and having an enlarged portion for radially supporting one end of a rotatable element having a normal direction of rotation, said portion providing a shoulder cooperating with rolling bearing elements and a surface on said rotatable element, to form a thrust bearing restricting axial movement of said element in one direction, a retaining member adjustably mounted on said pin providing a second shoulder cooperating with rolling bearing elements and another surface on the rotatable element to restrict axial movement of said element in the opposite direction, said retaining member being movable to cause separation of said shoulders in response to normal rotation of said member, and means limiting said separation.

7. In an anti-friction bearing, means forming a pin non-rotatably supported at its ends and having an enlarged portion adjacent one end for radially supporting a rotatable element, said element having a normal direction of rotation, said portion providing a shoulder cooperating with rolling bearing elements and a surface on said rotatable element, to form a thrust bearing restricting axial movement of said element in one direction, a retaining member threadedly mounted on said pin providing a surface cooperating with rolling bearing elements and another surface on the rotatable element to restrict axial movement of said element in the opposite direction, the direction of the threads being such that normal rotation of said element causes the surface on the retaining member to move away from said shoulder, said support serving to limit such movement.

ALFRED MUHLBACH.

REFERENCES CITED

The following references are of record in the file of this patent:

UNITED STATES PATENTS

| Number | Name | Date |
|--------|------|------|
| 2,058,627 | Reed | Oct. 27, 1936 |
| 2,235,982 | Crum | Mar. 25, 1941 |
| 2,210,279 | Catland | Aug. 6, 1940 |
| 2,214,221 | Catland | Sept. 10, 1940 |
| 2,329,751 | Fermier | Sept. 21, 1943 |